United States Patent
Zones

(10) Patent No.: US 10,478,811 B2
(45) Date of Patent: Nov. 19, 2019

(54) SYNTHESIS OF MTW FRAMEWORK TYPE ZEOLITES VIA INTERZEOLITE TRANSFORMATION

(71) Applicant: Chevron U.S.A. Inc., San Ramon, CA (US)

(72) Inventor: Stacey Ian Zones, San Francisco, CA (US)

(73) Assignee: CHEVRON USA. INC., San Ramon, CA (US)

( * ) Notice: Subject to any disclaimer, the term of this patent is extended or adjusted under 35 U.S.C. 154(b) by 297 days.

(21) Appl. No.: 15/785,546

(22) Filed: Oct. 17, 2017

(65) Prior Publication Data

US 2018/0133701 A1    May 17, 2018

Related U.S. Application Data

(60) Provisional application No. 62/423,271, filed on Nov. 17, 2016.

(51) Int. Cl.

| | | |
|---|---|---|
| *C01B 39/48* | (2006.01) | |
| *B01J 29/70* | (2006.01) | |
| *B01J 29/74* | (2006.01) | |
| *C01B 39/02* | (2006.01) | |
| *B01J 37/00* | (2006.01) | |
| *B01J 37/08* | (2006.01) | |
| *B01J 37/10* | (2006.01) | |

(52) U.S. Cl.
CPC ....... *B01J 29/7469* (2013.01); *B01J 29/7034* (2013.01); *B01J 37/0018* (2013.01); *B01J 37/088* (2013.01); *B01J 37/10* (2013.01); *C01B 39/026* (2013.01); *C01B 39/48* (2013.01); *B01J 2229/38* (2013.01)

(58) Field of Classification Search
CPC ... C01B 39/026; C01B 39/48; B01L 29/7034; B01L 29/7469; B01L 37/10; B01L 2229/38
See application file for complete search history.

(56) References Cited

U.S. PATENT DOCUMENTS

| | | |
|---|---|---|
| 3,832,449 A | 8/1974 | Rosinski et al. |
| 4,391,785 A | 7/1983 | Rosinski et al. |
| 4,452,769 A | 6/1984 | Chu et al. |
| 4,482,531 A | 11/1984 | Kuehl |
| 4,537,758 A | 8/1985 | Chu et al. |
| 4,539,193 A | 9/1985 | Valyocsik |
| 4,552,738 A | 11/1985 | Rubin |
| 4,552,739 A | 11/1985 | Kuhl |

(Continued)

FOREIGN PATENT DOCUMENTS

| | | |
|---|---|---|
| EP | 162719 | 11/1985 |
| GB | 2079735 | 1/1982 |

OTHER PUBLICATIONS

Moteki et al, "A General Method for Aluminum Incoroporation into High-Silica Zeolites Prepared in Fluoride Media", Chemistry of Materials, (2016), 28, 638-649. Published Dec. 17, 2015 (Year: 2015).*

(Continued)

*Primary Examiner* — David M Brunsman
(74) *Attorney, Agent, or Firm* — Terrence Flaherty

(57) ABSTRACT

A method is disclosed for synthesizing MTW framework type zeolites via interzeolite transformation in the presence of polyethyleneimine.

11 Claims, 2 Drawing Sheets

(56) References Cited

U.S. PATENT DOCUMENTS

| | | | |
|---|---|---|---|
| 4,557,919 | A | 12/1985 | Sumitani et al. |
| 4,585,637 | A | 4/1986 | Rubin |
| 4,585,746 | A | 4/1986 | Valyocsik |
| 4,636,373 | A | 1/1987 | Rubin |
| 4,743,437 | A | 5/1988 | Whittam |
| 5,021,141 | A | 6/1991 | Rubin |
| 5,137,705 | A | 8/1992 | Valyocsik |
| 5,192,521 | A | 3/1993 | Moini et al. |
| 6,652,832 | B2 | 11/2003 | Malek |
| 6,660,682 | B2* | 12/2003 | Cao ............... B01J 29/06 423/305 |
| 6,805,851 | B1* | 10/2004 | Muller ............ C01B 37/00 423/705 |
| 8,202,506 | B2 | 6/2012 | Lai et al. |
| 8,679,451 | B2 | 3/2014 | Burton, Jr. et al. |
| 2011/0123433 | A1 | 5/2011 | Burton |
| 2015/0038322 | A1 | 2/2015 | Zones et al. |
| 2016/0023912 | A1* | 1/2016 | Goel ............... C01B 39/023 423/709 |
| 2016/0023913 | A1* | 1/2016 | Goel ............... B01J 29/40 423/709 |

OTHER PUBLICATIONS

PCT International Search Report, International Patent Appl. No. PCT/US2017/056925, dated Jan. 23, 2018.

* cited by examiner

SYNTHESIS OF MTW FRAMEWORK TYPE ZEOLITES VIA INTERZEOLITE TRANSFORMATION

CROSS REFERENCE TO RELATED APPLICATIONS

The present application claims priority from U.S. Provisional Patent Application No. 62/423,271, filed on Nov. 17, 2016, the disclosure of which is hereby incorporated by reference in its entirety.

TECHNICAL FIELD

This disclosure relates generally to the synthesis of MTW framework type zeolites.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Molecular sieves such as zeolites have been used extensively in catalysis, adsorption, separation, and chromatography.

Molecular sieves identified by the International Zeolite Association as having the framework type MTW are known. Examples of MTW framework type materials include CZH-5, NU-13, Theta-3, TPZ-12, and ZSM-12. MTW framework type materials have a one-dimensional pore system with 12-membered rings.

U.K. Patent Application No. 2,079,735 discloses CZH-5 and its synthesis using choline as a structure directing agent.

U.S. Pat. No. 4,743,437 discloses NU-13 and its synthesis in the presence of a piperazine compound as a structure directing agent.

European Patent Application No. 162,719 discloses Theta-3 and its synthesis in the-presence of a quaternary nitrogen compound of formula $BzNR_3^+X^-$ where Bz is a benzyl radical, R is hydrocarbyl group and $X^-$ is an anion.

U.S. Pat. No. 4,557,919 discloses TPZ-12 and its synthesis in the presence of a pyrrolidine- or piperidine-containing diammonium compound as a structure directing agent.

ZSM-12 and its conventional preparation in the presence of a tetramethylammonium or tetraethylammonium structure directing agent are disclosed in U.S. Pat. No. 3,832,449.

U.S. Pat. No. 4,391,785 discloses a method for the synthesis of ZSM-12 from a reaction mixture comprising, as a structure directing agent, a compound selected from the group consisting of a dimethylpyridinium halide and a dimethylpyrrolidinium halide.

U.S. Pat. No. 4,452,769 and U.S. Pat. No. 4,537,758 disclose methods for synthesizing ZSM-12 from a reaction mixture containing methyltriethylammonium cations as the structure directing agent.

Other structure directing agents that have been used to synthesize ZSM-12 include DABCO-$C_n$-diquat cations where n=4, 5, 6 or 10 (see U.S. Pat. No. 4,482,531), bis(dimethylpiperidinium)trimethylene cations (see U.S. Pat. No. 4,539,193), benzyltriethylammonium cations (see U.S. Pat. No. 4,552,738), dibenzyldimethylammonium cations (see U.S. Pat. No. 4,636,373), dimethyldiethylammonium cations (see U.S. Pat. No. 4,552,739), benzyltrimethylammonium cations (see U.S. Pat. No. 4,585,637), bis(N-methylpyridyl)ethylinium cations (see U.S. Pat. No. 4,585,746), hexamethyleneimine (U.S. Pat. No. 5,021,141), decamethonium cations (see U.S. Pat. No. 5,192,521), bis(methylpyrrolidinium) diquat-n cations where n=4, 5 or 6 (see U.S. Pat. No. 5,137,705), and 1,6-bis(2,3-dimethylimidazolium)hexane dications (see U.S. Pat. No. 8,679,451).

According to the present disclosure, it has now been found that MTW framework type zeolites can be synthesized by interzeolite conversion (i.e., the transformation of one zeolite structure into another one) in the presence of polyethyleneimine, and, in some cases, it has been found that small crystal forms of MTW framework zeolites can be produced.

SUMMARY

In one aspect, there is provided a method of synthesizing a MTW framework type zeolite, the method comprising (a) preparing a reaction mixture comprising: (1) a FAU framework type zeolite; (2) polyethyleneimine; (3) fluoride ions; and (4) water; and (b) subjecting the reaction mixture to crystallization conditions sufficient to form crystals of the MTW framework type zeolite.

In another aspect, there is provided a MTW framework type zeolite comprising polyethyleneimine within its pore structure.

The MTW framework type zeolite has a composition, in its as-synthesized and anhydrous form, in terms of molar ratios, as follows:

|  | Broad | Exemplary |
| --- | --- | --- |
| $SiO_2/Al_2O_3$ | ≥10 | 30 to 500 |
| $Q/SiO_2$ | >0 to 0.1 | >0 to 0.1 |
| $F/SiO_2$ | >0 to 0.1 | >0 to 0.1 | wherein Q is polyethyleneimine.

BRIEF DESCRIPTION OF THE DRAWINGS

FIG. 2(a) is a plot of n-decane conversion as a function of temperature. FIG. 2(b) is a plot of product distribution as a function of conversion.

DETAILED DESCRIPTION

Introduction

Figure 1:
FIG. 1 is a scanning electron micrograph (SEM) image of the as-synthesized zeolite prepared in Example 1.

The following terms will be used throughout the specification and will have the following meanings unless otherwise indicated.

The term "zeolite" refers to crystalline aluminosilicate compositions which are microporous and which are formed from corner-sharing $AlO_2$ and $SiO_2$ tetrahedra.

The term "framework type" is used in the sense described in the "Atlas of Zeolite Framework Types," Sixth Revised Edition, Elsevier, 2007.

The term "as-synthesized" refers to a zeolite in its form after crystallization, prior to removal of the organic structure directing agent.

The term "anhydrous" is employed herein to refer to a zeolite substantially devoid of both physically adsorbed and chemically adsorbed water.

As used herein, the numbering scheme for the Periodic Table Groups is as described in *Chem. Eng. News,* 63(5), 26-27 (1985).

Reaction Mixture

In general, the present MTW framework type zeolite is synthesized by: (a) preparing a reaction mixture comprising: (1) a FAU framework type zeolite; (2) polyethyleneimine; (3) fluoride ions; and (4) water; and (b) subjecting the reaction mixture to crystallization conditions sufficient to form crystals of the MTW framework type zeolite.

The composition of the reaction mixture from which the MTW framework type zeolite is formed, in terms of molar ratios, is identified in Table 1 below:

TABLE 1

| Reactants | Broad | Exemplary |
|---|---|---|
| $SiO_2/Al_2O_3$ | ≥10 | 30 to 500 |
| $Q/SiO_2$ | 0.10 to 0.60 | 0.10 to 0.60 |
| $F/SiO_2$ | 0.10 to 0.60 | 0.10 to 0.60 |
| $H_2O/SiO_2$ | 5 to 60 | 10 to 40 | wherein compositional variable Q is polyethyleneimine.

Suitable FAU framework type zeolites are commercially available from, for example, Zeolyst International (Conshohocken, Pa.) and Tosoh Corporation (Tokyo, Japan).

The polyethyleneimine may be a linear or branched polyethyleneimine. Suitable polyethyleneimines include those having a number average molecular weight ($M_n$) in a range of 1500 to 5000.

Suitable sources of fluoride ions include hydrogen fluoride, ammonium fluoride, and ammonium hydrogen difluoride.

The reaction mixture may also use seeds of a molecular sieve material, such as a MTW framework type zeolite from a previous synthesis, desirably in an amount from 0.01 to 10,000 ppm (e.g., 100 ppm to 5,000 ppm) by weight of the reaction mixture.

The reaction mixture can be prepared either batch wise or continuously. Crystal size, morphology and crystallization time of the crystalline zeolite described herein can vary with the nature of the reaction mixture and the crystallization conditions.

Crystallization and Post-Synthesis Treatment

Crystallization of the MTW framework type zeolite from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 5 to 20 days. Crystallization is usually carried out in a closed system under autogenous pressure.

Once crystals of the MTW framework type zeolite have formed, the solid product is recovered from the reaction mixture by standard mechanical separation techniques such as centrifugation or filtration. The crystals are water-washed and then dried to obtain the as-synthesized zeolite crystals. The drying step is typically performed at a temperature of less than 200° C.

As a result of the crystallization process, the recovered crystalline zeolite product contains within its pore structure at least a portion of the structure directing agent used in the synthesis.

The Q and F components, which are associated with the as-synthesized product as a result of their presence during crystallization, are easily removed by conventional post-crystallization methods.

The as-synthesized MTW framework type zeolite may be subjected to treatment to remove part or all of the organic structure directing agent used in its synthesis. This can be conveniently accomplished by thermal treatment, in which the as-synthesized material can be heated to a temperature of at least 370° C. for at least 1 minute and generally not longer than 20 hours. The thermal treatment can be performed at a temperature up to about 925° C. While sub-atmospheric pressure can be employed for the thermal treatment, atmospheric pressure can be desired for reasons of convenience. Additionally or alternatively, the organic structure directing agent can be removed by treatment with ozone (see, e.g., A. N. Parikh et al., *Micropor. Mesopor. Mater.* 2004, 76, 17-22).

The present zeolite synthesis can be carried out in the absence of Group 1 and/or Group 2 metal cations, thereby obviating the need for ion-exchange of the product after thermal treatment to remove any occluded structure directing agent. Any cations in the present MTW framework type zeolite can be replaced in accordance with techniques well known in the art, e.g., by ion exchange with other cations. Preferred replacing cations can include metal ions, hydrogen ions, hydrogen precursor (e.g., ammonium) ions, and combinations thereof. Particularly preferred replacing cations can include those that can tailor the catalytic activity for adsorption and/or for certain hydrocarbon conversion reactions. Such cations include hydrogen, rare earth metals, and/or one or more metals of Groups 2-15 of the Periodic Table of the Elements.

The present MTW framework type zeolite may be intimately combined with a hydrogenating component, such as chromium, molybdenum, manganese, rhenium, cobalt, nickel, and/or a noble metal such as palladium or platinum, where a hydrogenation-dehydrogenation function may be performed. Such component can be in the composition by way of co-crystallization, exchanged into the composition, impregnated therein, intimately physically admixed therewith, or via any suitable method known to those in the art.

The present MTW framework type zeolite may be used as a sorbent and/or as a catalyst. When used as a catalyst, it may be desirable to incorporate the present zeolite with another material that is resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels, including mixtures of silica and metal oxides. Use of a material in conjunction with the present zeolite, i.e., combined therewith or present during synthesis of the new crystal, which is active, tends to change the conversion and/or selectivity of the catalyst in certain organic conversion processes.

Moreover, inactive materials suitably serve as diluents to control the amount of conversion in a given process so that products can be obtained in an economic and orderly manner without employing other means for controlling the rate of reaction. Such inactive materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the present zeolite include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

Binders useful for compositing with the present zeolite also include inorganic oxides, such as silica, zirconia, titania, magnesia, beryllia, alumina, and mixtures thereof.

In addition to the foregoing materials, the present zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of the present MTW framework type zeolite and matrix may vary widely, with the content of the MTW framework type zeolite ranging from 1 to 90% by weight (e.g., 2 to 80% by weight) of the composite.

The present MTW framework type zeolite may have possible application or use as a catalyst in a wide variety of hydrocarbon conversion processes such as in hydrocracking, isomerization, hydrogenation, dehydrogenation, polymerization, reforming, toluene disproportionation, and ethylbenzene conversion.

Characterization of the Zeolite

In its as-synthesized and anhydrous form, the present MTW framework type zeolite has a chemical composition, in terms of molar ratios, as described in Table 2:

TABLE 2

|  | Broad | Exemplary |
|---|---|---|
| $SiO_2/Al_2O_3$ | ≥10 | 30 to 500 |
| $Q/SiO_2$ | >0 to 0.1 | >0 to 0.1 |
| $F/SiO_2$ | >0 to 0.1 | >0 to 0.1 | wherein Q is polyethyleneimine.

It should be noted that the as-synthesized form of the present MTW framework type zeolite may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, the present MTW framework type zeolite has a chemical composition comprising the molar relationship:

$$Al_2O_3:(n)SiO_2$$

wherein n≥10 (e.g., 30 to 500, or 30 to 100).

The present MTW framework type zeolite synthesized is characterized by its powder X-ray diffraction pattern. Powder XRD patterns representative of MTW framework type zeolites can be referenced in the "*Collection of Simulated XRD Powder Patterns for Zeolites*," Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

EXAMPLES

The following illustrative examples are intended to be non-limiting.

Example 1

A Teflon liner was charged with 1.08 g of CBV-780 Y-zeolite (Zeolyst International, $SiO_2/Al_2O_3$ molar ratio=80), 4.86 g of deionized water, 0.42 g of a linear polyethyleneimine ($M_n$=1800) and, lastly, 0.36 g of concentrated HF. The resulting gel was stirred until it became homogeneous. The liner was then capped and placed within a Parr steel autoclave reactor. The autoclave was then placed in an oven and the heated at 170° C. for 11 days with rotation (43 rpm). The solid products were recovered by filtration, washed with deionized water and dried at 95° C.

The powder XRD pattern of the product was consistent with the product being small crystal MTW framework type zeolite. A SEM image of the product is shown in FIG. 1. The product is composed of very thin single rods aggregated into clusters of rods. The average width of the rods is less than 100 nm.

The product had a $SiO_2/Al_2O_3$ molar ratio of 70, as determined by ICP elemental analysis.

Example 2

Material from Example 1 was calcined in air at 595° C. for 5 hours. After calcination, the material was loaded with palladium by mixing for three days at room temperature 4.5 g of a 0.148 N $NH_4OH$ solution with 5.5 g of deionized water and then a $(NH_3)_4Pd(NO_3)_2$ solution (buffered at pH 9.5) such that 1 g of this solution mixed in with 1 g of zeolite provided a 0.5 wt. % Pd loading. The recovered Pd/MTW zeolite was washed with deionized water, dried at 95° C., and then calcined in air at 482° C. for 3 hours. The calcined Pd/MTW catalyst was then pelletized, crushed, and sieved to 20-40 mesh.

Figure 2B:
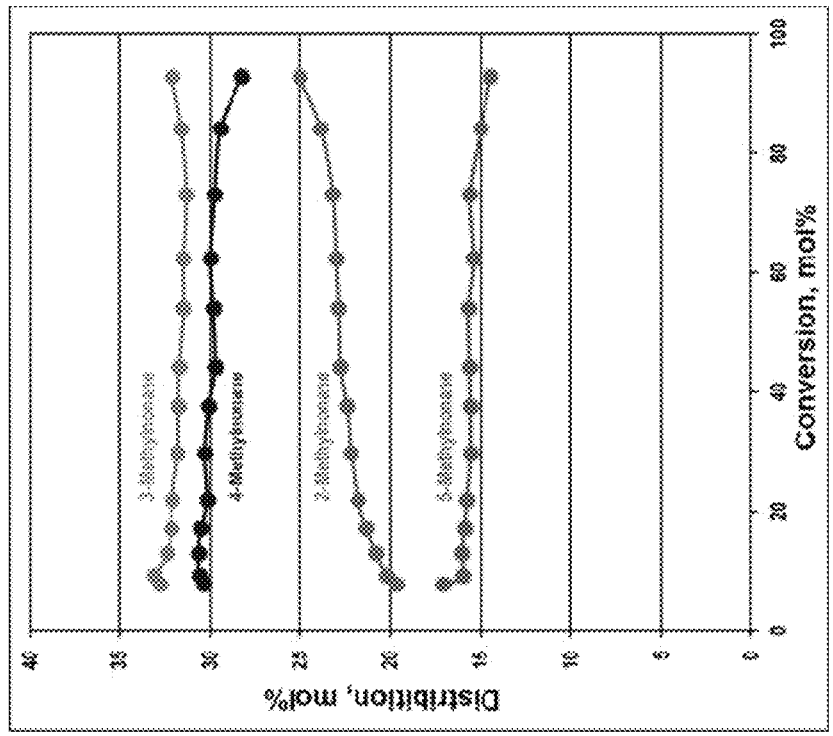
FIGS. 2(a) and 2(b) show the results of selective hydroconversion of n-decane over the Pd/MTW catalyst of Example 2.
Figure 2A:
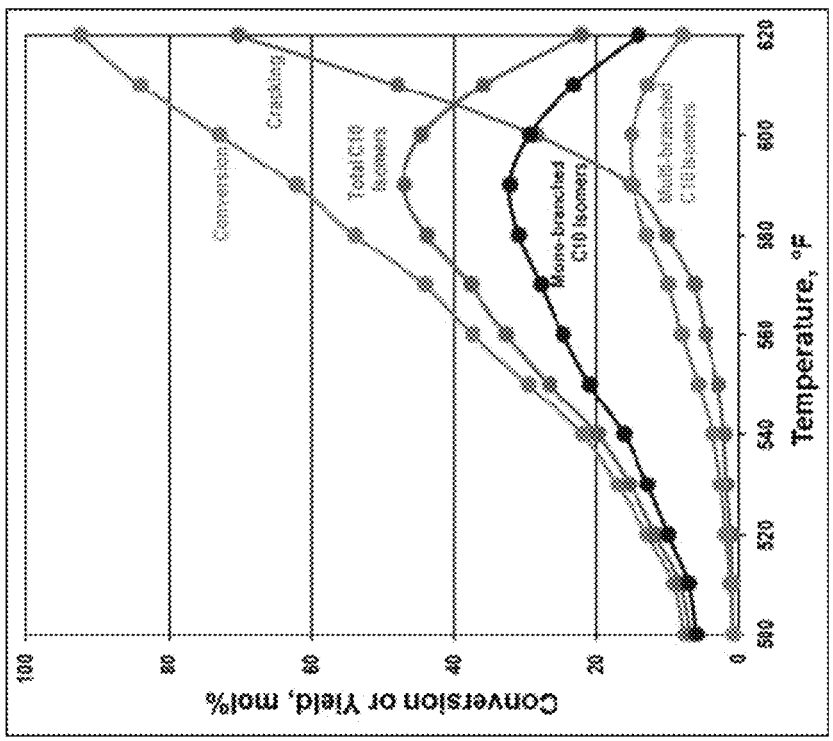

For catalytic testing, 0.5 g of the Pd/MTW catalyst was loaded in the center of a 23 inch-long by 0.25 inch outside diameter stainless steel reactor tube with alundum sand upstream of the catalyst for preheating the feed (a total pressure of 1200 psig; a down-flow hydrogen rate of 160 mL/min, when measured at 1 atmosphere pressure and 25° C.; and a down-flow liquid feed rate of 1 mL/hour). All materials were first reduced in flowing hydrogen at about 315° C. for 1 hour. Products were analyzed by on-line capillary gas chromatography (GC) once every 60 minutes. Raw data from the GC was collected by an automated data collection/processing system and hydrocarbon conversions were calculated from the raw data. Conversion is defined as the amount n-decane reacted to produce other products (including iso-$C_{10}$). Yields are expressed as mole percent of products other than n-decane and include iso-$C_{10}$ isomers as a yield product. The results are shown in FIGS. 2(a) and 2(b).

The invention claimed is:

1. A method of synthesizing a MTW framework type zeolite, the method comprising:
   (a) preparing a reaction mixture comprising:
      (1) a FAU framework type zeolite;
      (2) polyethyleneimine (Q);
      (3) fluoride ions; and
      (4) water; and (b) subjecting the reaction mixture to crystallization conditions sufficient to form crystals of the MTW framework type zeolite.

2. The method of claim 1, wherein the reaction mixture has a composition, in terms of molar ratios, as follows:

| | |
|---|---|
| $SiO_2/Al_2O_3$ | ≥10 |
| $Q/SiO_2$ | 0.10 to 0.60 |
| $F/SiO_2$ | 0.10 to 0.60 |
| $H_2O/SiO_2$ | 5 to 60. |

3. The method of claim 1, wherein the reaction mixture has a composition, in terms of molar ratios, as follows:

| | |
|---|---|
| $SiO_2/Al_2O_3$ | 30 to 500 |
| $Q/SiO_2$ | 0.10 to 0.60 |
| $F/SiO_2$ | 0.10 to 0.60 |
| $H_2O/SiO_2$ | 10 to 40. |

4. The method of claim 1, wherein the polyethyleneimine is a linear polyethyleneimine.

5. The method of claim 4, wherein the linear polyethyleneimine has a number average molecular weight in a range of 1500 to 5000.

6. The method of claim 1, wherein the crystallization conditions include a temperature of from 125° C. to 200° C.

7. An MTW framework type zeolite comprising polyethyleneimine within its pore structure.

8. The MTW framework type zeolite of claim 7, and having, in its as-synthesized and anhydrous form, a composition, in terms of molar ratios, as follows:

| | |
|---|---|
| $SiO_2/Al_2O_3$ | ≥10 |
| $Q/SiO_2$ | >0 to 0.1 |
| $F/SiO_2$ | >0 to 0.1 | wherein Q is polyethyleneimine.

9. The MTW framework type zeolite of claim 7, and having, in its as-synthesized and anhydrous form, a composition, in terms of molar ratios, as follows:

| | |
|---|---|
| $SiO_2/Al_2O_3$ | 30 to 500 |
| $Q/SiO_2$ | >0 to 0.1 |
| $F/SiO_2$ | >0 to 0.1 | wherein Q is polyethyleneimine.

10. The MTW framework type zeolite of claim 7, wherein the polyethyleneimine is a linear polyethyleneimine.

11. The MTW framework type of claim 10, wherein the linear polyethyleneimine has a number average molecular weight in a range of 1500 to 5000.

* * * * *